United States Patent [19]

Kobayashi et al.

[11] Patent Number: 4,772,330

[45] Date of Patent: Sep. 20, 1988

[54] PROCESS FOR PRODUCING LOW WATER-ABSORPTION ARTIFICIAL LIGHTWEIGHT AGGREGATE

[75] Inventors: Waichi Kobayashi; Koji Usui; Kazuhiro Iwata, all of Ube, Japan

[73] Assignee: Ube Industries, Ltd., Ube, Japan

[21] Appl. No.: 14,929

[22] Filed: Feb. 13, 1987

[30] Foreign Application Priority Data

Feb. 14, 1986 [JP] Japan .................................. 61-31489

[51] Int. Cl.$^4$ ............................................. C04B 14/02
[52] U.S. Cl. ...................................... 106/400; 106/97; 106/DIG. 1; 106/501; 501/155; 524/4; 524/5
[58] Field of Search ................... 106/97, 118, DIG. 1, 106/306, 288 B; 501/155

[56] References Cited

U.S. PATENT DOCUMENTS

Re. 30,943  5/1982  Nicholson ........................... 106/118
4,341,562  7/1982  Ahlbeck ........................ 106/DIG. 1

4,701,222 10/1987 Kobayashi et al. ............. 106/288 B

Primary Examiner—Steven Capella
Attorney, Agent, or Firm—Frishauf, Holtz, Goodman & Woodward

[57] ABSTRACT

A process for producing a low water-absorbing artificial lightweight aggregate, which comprises:

granulating a starting powdery material containing coal ash, having such a particle size distribution that a residue on a 297 $\mu$m standard wire sieve is not more than 1 wt. %, and 1 to 20 parts by weight of a hydraulic material per 100 parts by weight of said coal ash in the presence of water;

curing the resulting granules for a period of not shorter than 20 hours; or heat-treating the resulting granules at a temperature of not higher than 700° C. for a period of not shorter than 30 minutes; and, calcining the granules at a temperature of 1,000° to 1,500° C.

22 Claims, No Drawings

PROCESS FOR PRODUCING LOW WATER-ABSORPTION ARTIFICIAL LIGHTWEIGHT AGGREGATE

BACKGROUND OF THE INVENTION

1. Field of the Invention

The present invention relates to a process for producing a low water-absorbing artificial lightweight aggregate from coal ash as a main starting material.

2. Description of Prior Art

There has recently been a tendency that structures such as buildings are made more weight-saving and heat-insulating from the viewpoints of energy-saving and resource-saving and the viewpoint of improving the earthquake-proofness. Accordingly, artificial lightweight aggregates are used as the aggregate for lightweight concrete.

These artificial lightweight aggregates must have such characteristics that they are lightweight and have high compressive strength and low water absorption. Further, it is desirable that they can be produced easily and inexpensively.

As such artificial lightweight aggregate, expanded shale aggregate has been conventionally used.

There are advantages that expanded shale artificial lightweight aggregate can be produced very inexpensively and has excellent physical properties. Recently, the quarrying of shale is often limited by reason of environmental protection.

Thus, the development of artificial lightweight aggregate to be substituted for the expanded shale aggregate has been extensively made, and methods using coal ash formed in the combustion of coal, as a main starting material are drawing attention.

Such methods are also drawing attention from the viewpoint of developing the effective utilization of coal ash formed in great quantities with rapid increase in the consumption of coal as an energy source.

Heretofore, various processes for producing artificial lightweight aggregate from coal ash as a main raw material (hereinafter referred to sometimes as coal ash artificial lightweight aggregate) have been proposed. These processes are disclosed, for instance, in Japanese Patent Publication Nos. 36(1961)-12580, 38(1963)-25820, 40(1965)-16270, 41(1966)-8239 and 54(1979)-6468 and Japanese Patent Provisional Publication No. 59(1984)-39757.

However, the production of artificial lightweight aggregate from coal ash as a main starting material in Japan has not been industrially done as yet, mainly because there are disadvantages that in the production of the coal ash artificial lightweight aggregate by the above-mentioned known processes on industrial scale, the rejection rate is high and hence, manufacturing cost is high as compared with expanded shale artificial lightweight aggregate commercially available in Japan.

The present inventors have made studies on the above described aggregates, and as a result, they have found that the known processes are suitable only for use in the production of a small amount of artificial lightweight aggregate on laboratory scale. These known processes have problems in production thereof on industrial scale in that granules (material to be calcined) are broken during manufacturing and hence, there is a difficulty in obtaining artificial lightweight aggregate having the desired shape, and as a result its manufacturing cost is increased.

Accordingly, it is eagerly demanded to provide a novel lightweight aggregate to be substituted for the expanded shale artificial lightweight aggregate and to develop a technique for the effective utilization of coal ash. However, the production of coal ash artificial lightweight aggregate has not been industrialized in Japan as yet.

The present inventors had already invented a process for producing coal ash artificial lightweight aggregate on industrial scale and the invention was now pending as U.S. Patent 4,701,222. The invention relates to a process for producing an artificial lightweight aggregate comprising granulating a starting powdery material containing at least 80 wt.% of coal ash having a Blaine specific surface area of 2,000 to 9,000 $cm^2/g$ to give granules having an apparent specific gravity of 1.1 to 1.8 and a crushing strength of 0.6 kgf or above at room temperature as well as after heating at 600° C.; and calcining the granules at a temperature of 1,100° to 1,600° C.

The invention relates to a process in which the granules having a crushing strength within a specific range and an apparent specific gravity within a specific range are prepared so that the wear pulverizing rate of the granules is low, that is the granules are hardly broken during the calcining stage and hence, artificial lightweight aggregate can be advantageously produced on industrial scale.

The inventors have made further studies on the above process and found a novel process which allows the characteristics of the granules to be improved. It has also been found that the production of the artificial lightweight aggregate can be much more advantageously carried out on industrial scale by said process.

SUMMARY OF THE INVENTION

It is an object of the present invention to provide a process for easily producing a coal ash artificial lightweight aggregate having excellent characteristics on an industrial scale.

It is another object of the present invention to provide a process for effectively utilizing coal ash for which an effective use has not been developed.

The present invention relates to a process for producing a low water-absorbing artificial lightweight aggregate, which comprises:

granulating a starting powdery material containing coal ash, having such particle size distribution that a residue on 297 μm standard wire sieve is not more than 1 wt.%, and 1 to 20 parts by weight of a hydraulic material per 100 parts by weight of said coal ash in the presence of water;

curing the resulting granules for a period of not shorter than 20 hours; and calcining the granules at a temperature of 1,000° to 1,500° C.

Further, the present invention provides a process for producing a low water-absorbing artificial lightweight aggregate comprising heat-treating the granules at a temperature of not higher than 700° C. for a period of not shorter than 30 minutes, instead of curing the granules for a period of not shorter than 20 hours in the above-mentioned process.

According to the process of the present invention, an artificial lightweight aggregate can be easily produced from coal ash as a main starting material an industrial scale.

Further, coal ash for which an effective use has not been developed, can be effectively utilized by the process of the present invention.

DETAILED DESCRIPTION OF THE INVENTION

In the process of the present invention, a starting powdery material containing coal ash and a hydraulic material is granulated to prepare granules.

As coal ash, there can be used coal ash formed in the combustion or gasification of coal by conventional methods. If desired, coal ash is classified. Examples of such coal ashes include fly ash, cinder ash, bottom ash, clinker ash and coal ash slag.

It is necessary that said coal ash has such a particle size distribution that a residue on a 297 $\mu$m standard wire sieve is not more than 1 wt.%. When the residue on the 297 $\mu$m standard wire sieve exceeds 1 wt.%, the granules are liable to be broken. Further, it is necessary that the residue is not more than 1 wt.% from the viewpoint of ensuring uniformity in the distribution of closed cells in the resulting artificial lightweight aggregate.

Coal ash should have a Blaine specific surface area of preferably 2,000 $cm^2/g$ or above, and a Blaine specific surface area of not less than 3,000 $cm^2/g$ is particularly preferred.

The starting powdery material contains the aforementioned coal ash and a hydraulic material.

The term "hydraulic material" used herein refers to inorganic materials having such properties that they are hardened by mixing with water. Usually, there is used, as the hydraulic material, a powder having a CaO component content of 30 wt.% or higher and such a particle size distribution that a residue on a 297 $\mu$m standard wire sieve is not more than 1 wt.%. Usually, the hydraulic material contains a $SiO_2$ component, an $Al_2O_3$ component and a $SO_3$ component in addition to said CaO component.

The hydraulic material should have a Blaine specific surface area of preferably 2,000 $cm^2/g$ or above.

Examples of the hydraulic materials include powders (hereinafter referred to sometimes as Cottrell dust) obtained by collecting dust by a dust collector, said dust being formed in the calcining step in the manufacturing of cement such as portland cement; blast furnace slag powder; and cements such as portland cement. Among them, Cottrell dust is preferred as a hydraulic material from the economical point of view.

The amount of the hydraulic material to be added is in the range of 1 to 20 parts by weight, preferably 5 to 15 parts by weight, per 100 parts by weight of said coal ash.

When the amount of the hydraulic material is less than 1 part by weight, there is a difficulty in obtaining granules having a given strength by bonding coal ash particles to one another and such granules are liable to be broken during calcining, while when the amount exceeds 20 parts by weight, the granules fuse together during calcining, the operation of the calcining apparatus becomes difficult and artificial lightweight aggregate can not be produced.

The starting powdery material may contain a hydrophilic paste in addition to the aforementioned coal ash and hydraulic material.

The hydraulic paste has an effect of promoting the bonding of the components to thereby improve the crushing strength of the granules. When the hydrophilic paste is used, the amount of water to be added in the granulation can be reduced and hence, there are advantages that the granules hardly suffer bursting in the calcining, lightweight aggregates having a uniform shape can be produced and the quantity of heat required for the evaporation of water is reduced. Particularly, when the granules are heat-treated at a temperature within a specific range as described in more detail hereinafter, the granules are calcined sometimes in relatively short time and hence, the effect of the addition of the hydrophilic paste is remarkable.

Examples of the hydrophilic pastes include polyvinyl alcohol, cellulose derivatives, polyacrylates, polyacrylamides, synthetic rubber latexes and epoxy emulsions. Polyvinyl alcohol is particularly preferred.

The hydrophilic paste is used in an amount of not more than 5 parts by weight, preferably 0.1 to 5 parts by weight per 100 parts by weight of coal ash.

When the amount of the hydrophilic paste exceeds 5 parts by weight, there is a possibility that the starting material is hardly granulated and briquetted.

The raw powdery material containing the above-stated components is granulated (briquetted) into the desired shape. The granulation (briquetting) is carried out in the presence of water.

It is preferred that the amount of water to be used in the granulation is as small as possible. The minimum amount of water required for retaining the shape of the granules at the initial stage is used, for instance, by carrying out the granulation while sprinkling water on the raw powdery material.

A pan type granulator, a rotary cylindrical granulator, a briquetting machine, a compression roller machine and a sample tabletting machine can be used for the granulation.

The thus-obtained granules are cured for at least 20 hours, preferably 24 to 120 hours. Usually, the curing is carried out in such a manner that the granules are allowed to stand under atmospheric conditions. When the curing time is shorter than 20 hours, there can not be obtained granules having a sufficient high strength (crushing strength), the granules are liable to be broken in the calcining step subsequent to the curing step and hence, effective calcination can not be carried out, while when the curing time is longer than 120 hours, the crushing strength is scarcely increased.

Since the hydration reaction of the hydraulic material proceeds by the curing and water is bonded to the hydraulic material, the amount of water in the free form in the granule, that is, water content in a general meaning is lowered.

Accordingly, since coal ash particles are bonded to one another as the hydration reaction of the hydraulic material proceeds, the crushing strength of the granule increases and water content lowers. Hence, the granules hardly suffers bursting in the calcination and the calcining device can be stably operated over a long period of time.

In the present invention, the granules may be heat-treated at a temperature of not higher than 700° C., preferably 100° to 550° C., more preferably 100° to 500° C. for at least 30 minutes, preferably 30 minutes to 2 hours, in place of carrying out the above-described curing.

Water in the granule is removed by the heat treatment and the water content thereof is lowered. The coal ash particles are bonded to one another by bonding power developed by the hydration reaction of the hydraulic material. Particularly, when the hydrophilic paste is used, the paste functions so as to supplement the bonding power of the hydraulic material to thereby give the granules having a sufficiently high strength, even when the hydration reaction does not proceeds well.

The granules to be heat-treated may be those obtained by the above-described cure.

When the heat-treating temperature exceeds 700° C., the granules are burst and broken.

Generally, the heat treatment time is such that when the heat-treating temperature is high, the time is short. It is necessary that the heat treatment is carried out for at least 30 minutes even when the heating temperature is as high as 700° C. When the time is shorter than 30 minutes, the granules having sufficient strength can not be obtained, even when the heat treatment temperature is high.

The heat treatment may be carried out using any of conventional dryers such as rotary dryer and conveyor band dryer.

The cured granule or the heat-treated granule has usually a crushing strength of not less than 0.6 kgf. The water content of the granule varies depending on the amount of water to be used, the composition of the starting powdery material, the curing time and the temperature and the time of the heat treatment, but is generally not more than 15 wt.%. When the curing is carried out over a long period of time, the water content can be lowered to 6 wt.% or below. When the heat treatment is carried out under preferred conditions, the water content can be reduced to 2 wt.% or below.

Generally, the apparent specific gravity lowers with lowering of the above-mentioned water content, and the granule after curing or heat treatment has generally an apparent specific gravity of 1.2 to 1.5. By lowering the apparent specific gravity of the granule, the difference in apparent specific gravity between the granule and the resulting artificial lightweight can be reduced. As a result, the change in particle size caused by calcination becomes smaller and the amounts of components released from the granule does not excessively increase. Thus, the probability that cells formed by calcination become closed cells, is increased.

The thus-cured or heat-treated granules are then calcined at a temperature of 1,000° to 1,500° C.

By the calcination, the coal ash particles constituting the granules and the hydraulic material particles are brought into semi-molten state to thereby bond the particles to one another and at the same time to release components such as water, carbon, sulfur, etc. contained in the granule as gases, whereby cells within the granule containing the semi-molten particles are formed to obtain a lightweight aggregate. Namely, viscous glass layers are formed within the granule brought into a semi-molten state by the calcination and as a results, the formed cells are uniformly distributed as closed cells in the glass layer, thus obtaining a low water-absorbing artificial lightweight aggregate having a high strength.

When the calcining temperature is lower than 1000° C., the granule is insufficiently expanded and there can not be produced the lightweight aggregate having a low specific gravity, while when the temperature is higher than 1,500° C., the granules fuse together to form large lumps and continuous operation of the calcining device can not be conducted.

The calcining can be carried out using any of conventional calcining devices such as rotary kiln and sintering grate. The heat treatment and the calcining may be carried out in the same device by adjusting conditions such as temperature, etc.

The artificial lightweight aggregate produced by the process of the present invention has usually an absolute dry specific gravity of not higher than 1.1. The absolute dry specific gravity can be lowered to 0.9 or below by adjusting the amount of the hydraulic material to a value within the range defined by the present invention. Since most of the cells within the lightweight aggregate produced by the present invention are closed cells, the lightweight aggregate has a low water absorption ratio of not greater than 4 wt.%. Usually, the lightweight aggregate of the present invention has a crushing strength of not less than 15 kgf.

The following examples, comparison examples and reference examples further illustrate the present invention.

EXAMPLE 1

10 parts by weight of Cottrell dust were added to 100 parts by weight of fly ash obtained from a boiler of a coal-fired steam power plant, and they were mixed in a ribbon mixer to obtain a starting powdery material. The physical properties of the fly ash and the Cottrell dust are shown in Table 1, and the compositions thereof are shown in Table 2.

The starting powdery material was fed to a pan type granulator provided with a pan (diameter: 1.5 m, angle of inclination: 50°, rotation; 16 r.p.m) at a feed rate of 85 kg/hr, and roll-granulated, while spraying water over the material, to produce granules having a particle diameter in the range of 5 to 15 mm.

The resulting granules were left to stand under atmospheric conditions to cure them for 24 hours (cured granules).

The apparent specific gravity, the water content and the crushing strength of the resulting cured granules are shown in Table 3.

The cured granules were calcined at a temperature of 1,350° C. and at a feed rate of 500 kg/hr (dry basis) in a rotary kiln (effective inner diameter: 0.9 m, effective length: 12 m, slop: 3.5/100) to produce an artificial lightweight aggregate.

The absolute dry specific gravity, the 24 hour water absorption ratio and the crushing strength of the resulting artificial lightweight aggregate are shown in Table 4.

TABLE 1

|  | Fly ash | Cottrell dust |
|---|---|---|
| Specific gravity | 2.13 | 2.87 |
| Blaine specific surface area (cm$^2$/g) | 3900 | 2600 |
| Fineness*$^1$ |  |  |
| 297 μm | 0.0 | 0.0 |
| 149 μm | 0.1 | 0.4 |
| 88 μm | 4.0 | 4.4 |
| 44 μm | 18.2 | 20.7 |

Note: Fineness represents the amount in wt. % of particle which do not pass through standard wire sieve specified above.

TABLE 2

| Chemical component | Weight % | |
|---|---|---|
| | Fly ash | Cottrell dust |
| ig. loss | 3.4 | 16.8 |
| $SiO_2$ | 56.5 | 14.3 |
| $Al_2O_3$ | 32.8 | 4.8 |
| $Fe_2O_3$ | 4.3 | 2.7 |
| CaO | 2.8 | 43.6 |
| MgO | 0.8 | 0.7 |
| $SO_3$ | 0.5 | 10.4 |
| $Na_2O$ | 0.6 | 0.3 |
| $K_2O$ | 0.8 | 3.4 |

The physical properties of the granules and the artificial lightweight aggregates were measured according to the following procedures:
Apparent specific gravity: Apparent specific gravity was measured according to JIS-M-8715-77.
Water content: Water content was measured by drying at 100° C. with Kett infrared moisture meter.
Crushing strength: Crushing strength was measured according to JIS-M-8718-82.
Absolute dry specific gravity and 24 hour water-absorption ratio: These properties were measured according to JIS-A-5002-78.

EXAMPLE 2

The procedure of Example 1 was repeated except that the curing time was 120 hours to produce cured granules. There was produced an artificial lightweight aggregate therefrom.

The apparent specific gravity, the water content and the crushing strength of the cured granules are shown in Table 3. The absolute dry specific gravity, the 24 hour water-absorption ratio and the crushing strength of the artificial lightweight aggregate are shown in Table 4.

EXAMPLE 3

The procedure of Example 2 was repeated except that the amount of Cottrell dust was 5 parts by weight to produce the cured granules. There was produced an artificial lightweight aggregate therefrom.

The apparent specific gravity, the water content and the crushing strength of the cured granules are shown in Table 3. The absolute dry specific gravity, the 24 hour water absorption ratio and the crushing strength of the artificial lightweight aggregate are shown in Table 4.

EXAMPLE 4

The procedure of Example 2 was repeated except that the amount of Cottrell dust was 15 parts by weight to produce the cured granules. There was produced an artificial lightweight aggregate therefrom.

The apparent specific gravity, the water content and the crushing strength of the cured granules are shown in Table 3. The absolute dry specific gravity, the 24 hour water-absorption ratio and the crushing strength of the artificial lightweight aggregate are shown in Table 4.

EXAMPLE 5

The procedure of Example 2 was repeated except that 0.5 parts by weight of polyvinyl alcohol per 100 parts by weight of coal ash was added to produce the cured granules. There was produced an artificial lightweight aggregate therefrom.

The apparent specific gravity, the water content and the crushing strength of the cured granules are shown in Table 3. The absolute dry specific gravity, the 24 hour water-absorption ratio and the crushing strength of the artificial lightweight aggregate are shown in Table 4.

EXAMPLE 6

The procedure of Example 2 was repeated except that 3.0 parts by weight of polyvinyl alcohol per 100 parts by weight of coal ash was added to produce the cured granules. There was produced an artificial lightweight aggregate therefrom.

The apparent specific gravity, the water content and the crushing strength of the cured granules are shown in Table 3. The absolute dry specific gravity, the 24 hour water-absorption ratio and the crushing strength of the artificial lightweight aggregate are shown in Table 4.

COMPARISON EXAMPLE 1

The procedure of Example 1 was repeated except that granules were calcined without subjecting them to the curing step.

An attempt to produce an artificial lightweight aggregate was made. However, the granules were broken in the kiln to form large lumps, and the artificial lightweight aggregate could not be produced.

The apparent specific gravity, the water content and the crushing strength of the granules are shown in Table 3.

COMPARISON EXAMPLE 2

The procedure of Example 2 was repeated except that the amount of Cottrell dust was 25 parts by weight to produce the cured granules. An attempt to produce an artificial lightweight aggregate was made. However, the granules fused together during calcination and the kiln had difficulty in its operation. Hence, there could not be produced an artificial lightweight aggregate.

The apparent specific gravity, the water content and the crushing strength of the granules are shown in Table 3.

TABLE 3

| | Apparent specific gravity | Water content (wt. %) | Crushing strength (kgf) |
|---|---|---|---|
| Example 1 | 1.44 | 14.1 | 0.6 |
| Example 2 | 1.22 | 1.0 | 1.2 |
| Example 3 | 1.16 | 0.6 | 1.0 |
| Example 4 | 1.32 | 1.3 | 2.0 |
| Example 5 | 1.32 | 3.2 | 2.4 |
| Example 6 | 1.40 | 5.1 | 5.1 |
| Comp. Ex. 1 | 1.56 | 22.1 | 0.5 |
| Comp. Ex. 2 | 1.33 | 1.3 | 2.3 |

TABLE 4

| | Absolute dry specific gravity | 24 hour water-absorption (wt. %) | Crushing strength (kgf) |
|---|---|---|---|
| Example 1 | 0.82 | 3.0 | 17.0 |
| Example 2 | 0.81 | 2.6 | 18.0 |
| Example 3 | 1.06 | 1.2 | 49.0 |
| Example 4 | 0.70 | 3.6 | 15.0 |
| Example 5 | 0.80 | 2.6 | 19.0 |
| Example 6 | 0.76 | 2.8 | 22.0 |
| Comp. Ex. 1 | production impossible | | |
| Comp. Ex. 2 | " | | |

EXAMPLE 7

The procedure of Example 5 was repeated except that the granules were heat-treated at 100° C. for 2 hours, instead of curing the granules. There were obtained the heat-treated granules, and there was produced an artificial lightweight aggregate therefrom.

The apparent specific gravity, the water content and the crushing strength of the heat-treated granules are shown in Table 5. The absolute dry specific gravity, the 24 hour water-absorption ratio and the crushing strength of the artificial lightweight aggregate are shown in Table 6.

EXAMPLE 8

The procedure of Example 7 was repeated except that the heat treatment temperature was 500° C. and the heat treatment time was 30 minutes to produce the heat-treated granules. There was produced an artificial lightweight aggregate therefrom.

The apparent specific gravity, the water content and the crushing strength of the heat-treated granules are shown in Table 5. The absolute dry specific gravity, the 24 hour water absorption ratio and the crushing strength of the artificial lightweight aggregate are shown in Table 6.

COMPARISON EXAMPLE 3

The procedure of Example 7 was repeated except that the heat treatment temperature was 800° C. and the heat treatment time was 30 minutes. However, the granules were burst and broken during the heat treatment, and there could not be obtained any heat-treated granules.

REFERENCE EXAMPLES 1 AND 2

The absolute dry specific gravity, the 24 hour water-absorption ratio and the crushing strength of commercially available expanded shale artificial lightweight aggregate are shown in Table 6.

TABLE 5

|  | Apparent specific gravity | Water content (wt. %) | Crushing strength (kgf) |
| --- | --- | --- | --- |
| Example 7 | 1.32 | 1.2 | 2.9 |
| Example 8 | 1.30 | 0.3 | 2.4 |
| Comp. Ex. 3 | production impossible | | |

TABLE 6

|  | Absolute dry specific gravity | 24 hour water-absorption (wt. %) | Crushing strength (kgf) |
| --- | --- | --- | --- |
| Example 7 | 0.78 | 3.0 | 21.0 |
| Example 8 | 0.75 | 3.5 | 20.0 |
| Comp. Ex. 3 | production impossible | | |
| Ref. Ex. 1 | 0.98 | 11.0 | 16.0 |
| Ref. Ex. 2 | 0.75 | 18.5 | 12.0 |

We claim:

1. A process for producing a low water-absorbing artificial lightweight aggregate, which comprises:

granulating a starting powdery material containing coal ash, having a particle size distribution such that the residue on a 297 μm standard wire sieve is not more than 2 wt.%, and 1 to 20 parts by weight of a hydraulic material per 100 parts by weight of said coal ash in the presence of water to form granules;

curing said granules for a period of not shorter than 20 hours; and calcining the cured granules at a temperature of 1,000° to 1,500° C.

2. The process for producing a low water-absorbing artificial lightweight aggregate as claimed in claim 1, wherein said granules are cured for 24 to 120 hours.

3. The process for producing a low water-absorbing artificial lightweight aggregate as claimed in claim 1, wherein said hydraulic material has a particle size distribution such that the residue on a 297 μm standard wire sieve is not more than 1 wt.%, and said hydraulic material is a hydraulic powder having a CaO content of not less than 30 wt.%.

4. The process for producing a low water-absorbing artificial lightweight aggregate as claimed in claim 3, wherein said hydraulic powder is a dust formed in calcining cement.

5. The process for producing a low water-absorbing artificial lightweight aggregate as claimed in claim 1, wherein the granules after being cured have a crushing strength of not less than 0.6 kgf at room temperature and an apparent specific gravity of 1.2 to 1.5.

6. The process for producing a low water-absorbing artificial lightweight aggregate as claimed in claim 1, wherein said starting powdery material contains not more than 5 parts by weight of a hydrophilic paste per 100 parts by weight of said coal ash.

7. The process for producing a low water-absorbing artificial lightweight aggregate as claimed in claim 6, wherein said hydrophilic paste is polyvinyl alcohol.

8. A process for producing a low water-absorbing artificial lightweight aggregate, which comprises:

granulating a starting powdery material containing coal ash, having a particle size distribution such that the residue on a 297 μm standard wire sieve is not more than 1 wt.% and 1 to 20 parts by weight of a hydraulic material per 100 parts by weight of said coal ash in the presence of water to form granules;

heat-treating said granules at a temperature of 100° to 700° C. for a period of not shorter than 30 minutes; and calcining the heat-treated granules at a temperature of 1,000° to 1,500° C.

9. The process for producing a low water-absorbing artificial lightweight aggregate as claimed in claim 8 wherein said granules are heat-treated at a temperature of 100° to 550° C. for 30 minutes to 2 hours.

10. The process for producing a low water-absorbing artificial lightweight aggregate as claimed in claim 8, wherein said hydraulic material has a particle size distribution such that the residue on a 297 μm standard wire sieve is not more than 1 wt.%, and said hydraulic material is a hydraulic powder having a CaO content of not lower than 30 wt.%.

11. The process for producing a low water-absorbing artificial lightweight aggregate as claimed in claim 10, wherein said hydraulic powder is a dust formed in calcining cement.

12. The process for producing a low water-absorbing artificial lightweight aggregate as claimed in claim 8, wherein the granules after heat treatment have a crushing strength of not less than 0.6 kgf and an apparent specific gravity of 1.2 to 1.5.

13. The process for producing a low water-absorbing artificial lightweight aggregate as claimed in claim 8, wherein said starting powdery material contains up to 5 parts by weight of a hydrophilic paste per 100 parts by weight of said coal ash.

14. The process for producing a low water-absorbing artificial lightweight aggregate as claimed in claim 13, wherein said hydrophilic paste is polyvinyl alcohol.

15. The process for producing a low water-absorbing artificial lightweight aggregate as claimed in claim 10, wherein
    said granules are heat-treated at a temperature of 100° to 550° C. for 30 minutes to 2 hours;
    said hydraulic powder is a dust formed in calcining cement;
    the granules after heat treatment have a crushing strength of not less than 0.6 kgf and an apparent specific gravity of 1.2 to 1.5; and
    said coal ash has a Blaine specific surface area of at least 2000 cm$^2$/g.

16. The process for producing a low water-absorbing artificial lightweight aggregate as claimed in claim 15, wherein
    said starting powdery material contains up to 5 parts by weight of a hydrophilic paste per 100 parts by weight of said coal ash; and
    said hydrophilic paste is selected from the group consisting of polyvinyl alcohol, cellulose derivatives, polyacrylates, polyacrylamides, synthetic rubber latexes and epoxy emulsions.

17. The process for producing a low water-absorbing artificial lightweight aggregate as claimed in claim 15, wherein
    said coal ash has a Blaine specific surface area of at least 3000 cm$^2$/g; and
    said hydraulic material is in an amount of 5 to 15 parts by weight per 100 parts by weight of said coal ash.

18. The process for producing a low water-absorbing artificial lightweight aggregate as claimed in claim 16, wherein
    said coal ash has a Blaine specific surface area of at least 3000 cm$^2$/g;
    said hydraulic material is in an amount of 5 to 15 parts by weight per 100 parts by weight of said coal ash; and
    said hydrophilic paste is polyvinyl alcohol in an amount of from 0.1 to 5 parts by weight per 100 parts by weight of coal ash.

19. The process for producing a low water-absorbing artificial lightweight aggregate as claimed in claim 3, wherein
    said granules are cured for 24 to 120 hours;
    said hydraulic powder is a dust formed in calcining cement;
    the granules after heat treatment have a crushing strength of not less than 0.6 kgf and an apparent specific gravity of 1.2 to 1.5; and
    said coal ash has a Blaine specific surface area of at least 2000 cm$^2$/g.

20. The process for producing a low water-absorbing artificial lightweight aggregate as claimed in claim 19, wherein
    said starting powdery material contains up to 5 parts by weight of a hydrophilic paste per 100 parts by weight of said coal ash; and
    said hydrophilic paste is selected from the group consisting of polyvinyl alcohol, cellulose derivatives, polyacrylates, polyacrylamides, synthetic rubber latexes and epoxy emulsions.

21. The process for producing a low water-absorbing artificial lightweight aggregate as claimed in claim 19, wherein
    said coal ash has a Blaine specific surface area of at least 3000 cm$^2$/g; and
    said hydraulic material is in an amount of 5 to 15 parts by weight per 100 parts by weight of said coal ash.

22. The process for producing a low water-absorbing artificial lightweight aggregate as claimed in claim 20, wherein
    said coal ash has a Blaine specific surface area of at least 3000 cm$^2$/g;
    said hydraulic material is in an amount of 5 to 15 parts by weight per 100 parts by weight of said coal ash; and
    said hydrophilic paste is polyvinyl alcohol in an amount of from 0.1 to 5 parts by weight per 100 parts by weight of coal ash.

* * * * *